United States Patent
Oshiumi et al.

(10) Patent No.: US 8,002,654 B2
(45) Date of Patent: Aug. 23, 2011

(54) CONTROL SYSTEM FOR BELT-TYPE CONTINUOUSLY VARIABLE TRANSMISSION

(75) Inventors: Yasuhiro Oshiumi, Gotenba (JP); Kunihiro Iwatsuki, Toyota (JP); Takayuki Amaya, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1666 days.

(21) Appl. No.: 11/051,182

(22) Filed: Feb. 7, 2005

(65) Prior Publication Data

US 2005/0192133 A1 Sep. 1, 2005

(30) Foreign Application Priority Data

Feb. 10, 2004 (JP) ................................. 2004-034037
Dec. 15, 2004 (JP) ................................. 2004-363420

(51) Int. Cl.
*F16H 59/06* (2006.01)
*F16H 61/662* (2006.01)

(52) U.S. Cl. ................. 474/28; 474/70; 701/61; 477/46

(58) Field of Classification Search .................... 474/18, 474/28, 70; 477/44, 45, 46, 48, 49, 50
See application file for complete search history.

(56) References Cited

U.S. PATENT DOCUMENTS

| | | | |
|---|---|---|---|
| 4,649,488 A * | 3/1987 | Osanai et al. ................... 701/60 |
| 4,729,103 A * | 3/1988 | Oshiage et al. ................. 701/61 |
| 5,075,860 A * | 12/1991 | Suzuki ............................ 701/60 |
| 5,136,495 A * | 8/1992 | Tokoro et al. ................... 701/61 |
| 6,142,908 A * | 11/2000 | Kidokoro et al. ............... 477/38 |
| 6,157,884 A * | 12/2000 | Narita et al. .................... 701/51 |
| 6,192,306 B1 * | 2/2001 | Kidokoro et al. ............... 701/51 |
| 6,343,235 B1 | 1/2002 | Hausen et al. |
| 6,430,491 B1 * | 8/2002 | Adachi et al. ................... 701/51 |
| 6,460,398 B1 | 10/2002 | Stopp et al. |
| 6,530,860 B2 * | 3/2003 | Ui .................................. 477/45 |

(Continued)

FOREIGN PATENT DOCUMENTS

DE 196 29 845 A1 1/1998

(Continued)

OTHER PUBLICATIONS

Search Report issued Oct. 11, 2010, in French Patent Application No. 0501314, filed Feb. 9, 2005.

*Primary Examiner* — Bradley T King
*Assistant Examiner* — Thomas Irvin
(74) *Attorney, Agent, or Firm* — Oblon, Spivak, McClelland, Maier & Neustadt, L.L.P.

(57) ABSTRACT

A control system for controlling a belt-type continuously variable transmission having a pulley capable of varying its groove width to which a belt is applied, in which the pulley is provided with an oil chamber to which the oil pressure is fed so that the pulley clamps the belt, in which the capacity of the oil chamber is varied in accordance with a change in the groove width, and in which the oil pressure in the oil chamber is controlled in accordance with a deviation between a target oil pressure and an actual oil pressure, comprising: a pressure-receiving capacity change detecting device for detecting a change in the capacity of the oil chamber; and an oil pressure control contents altering device for altering a degree to reflect the deviation on the oil pressure control of the oil chamber on the basis of a change in the capacity.

20 Claims, 8 Drawing Sheets

U.S. PATENT DOCUMENTS

| | | | |
|---|---|---|---|
| 6,669,598 B2 * | 12/2003 | Berger et al. | 477/45 |
| 6,813,551 B2 | 11/2004 | Taniguchi et al. | |
| 7,029,410 B2 * | 4/2006 | Sawada et al. | 474/28 |
| 7,222,005 B2 * | 5/2007 | Kang et al. | 701/29 |
| 2002/0173391 A1 | 11/2002 | Endo et al. | |
| 2003/0149520 A1 * | 8/2003 | Taniguchi et al. | 701/59 |
| 2004/0092343 A1 * | 5/2004 | Sawada | 474/18 |
| 2004/0092344 A1 * | 5/2004 | Watanabe et al. | 474/18 |
| 2004/0110584 A1 * | 6/2004 | Sawada et al. | 474/18 |
| 2004/0116219 A1 * | 6/2004 | Watanabe et al. | 474/18 |
| 2004/0116220 A1 * | 6/2004 | Yamamoto et al. | 474/18 |
| 2004/0127313 A1 * | 7/2004 | Shimanaka et al. | 474/18 |

FOREIGN PATENT DOCUMENTS

| | | |
|---|---|---|
| DE | 103 04 287 A1 | 9/2003 |
| EP | 0 424 005 A2 | 4/1991 |
| JP | 62-166122 | 7/1987 |
| JP | 63-269745 | 11/1988 |
| JP | 5-240331 | 9/1993 |
| JP | 6-207658 | 7/1994 |
| JP | 9-280361 | 10/1997 |
| JP | 2001-132827 | 5/2001 |
| JP | 2001-248717 | 9/2001 |

* cited by examiner

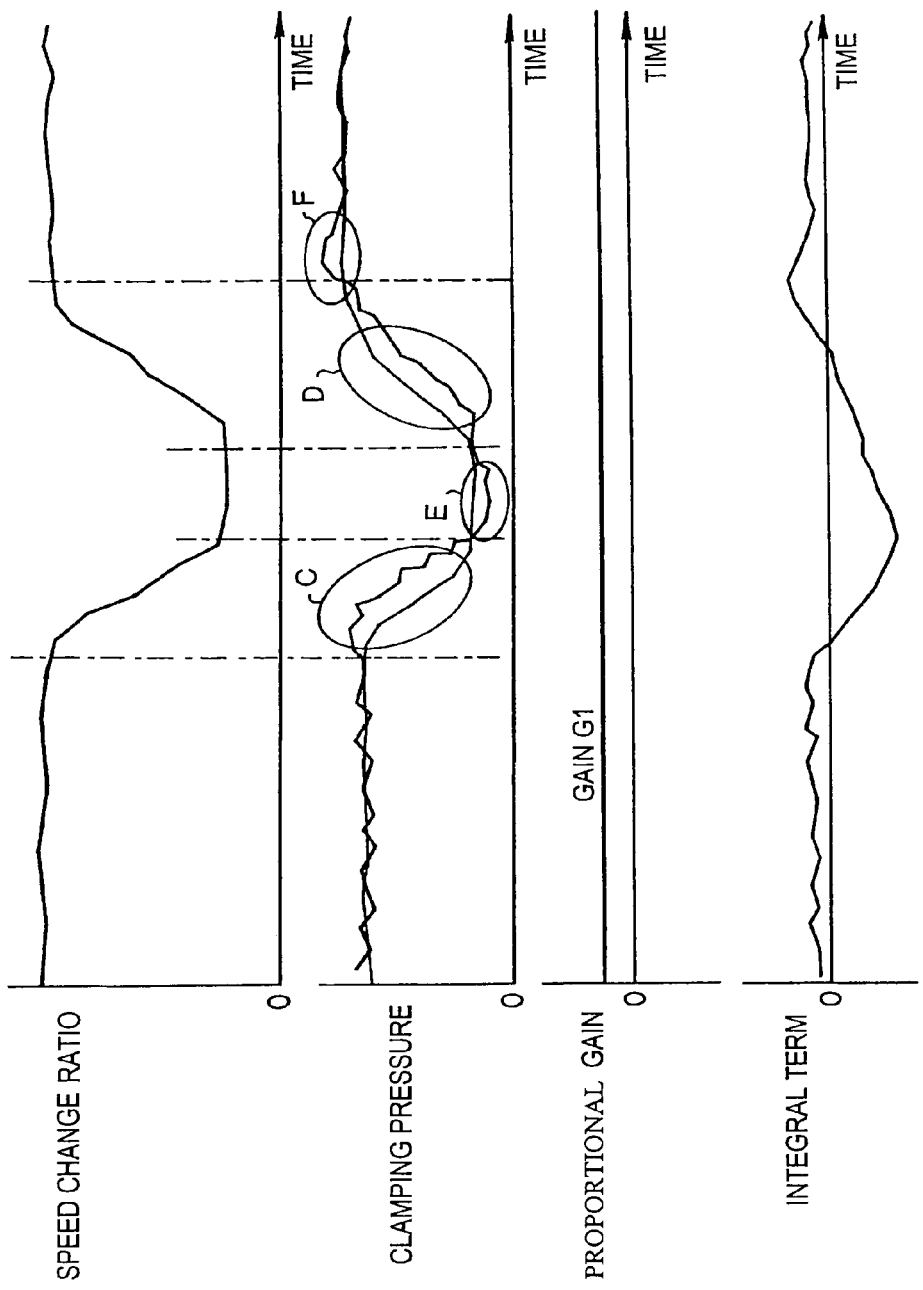

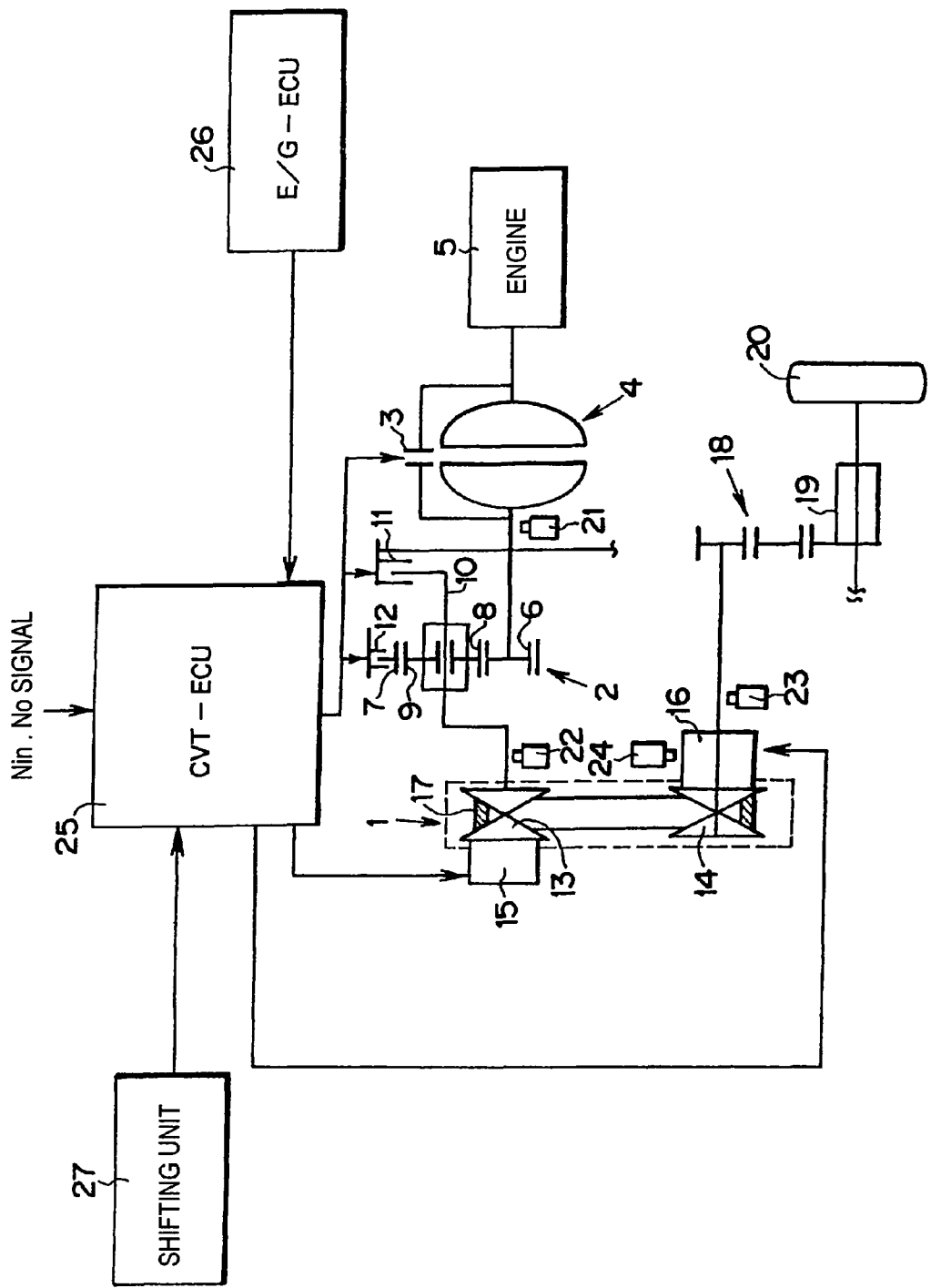

CONTROL SYSTEM FOR BELT-TYPE CONTINUOUSLY VARIABLE TRANSMISSION

BACKGROUND OF THE INVENTION

1. Field of the Invention

This invention relates generally to a belt-type continuously variable transmission, in which a speed change ratio is varied continuously by changing effective running radii of a belt applied on a drive pulley and a driven pulley having variable groove widths. More particularly, this invention relates to a control system of the continuously variable transmission.

The disclosure of Japanese Patent Applications No. 2004-34037 filed on Feb. 10, 2004, and No. 2004-363420 filed on Dec. 15, 2004, including specification, drawings and claims is incorporated herein by reference in its entirety.

2. Discussion of the Related Art

In the prior art, it is known to optimize the running state of an engine by arranging a continuously variable transmission on the output side of the engine, and by continuously controlling a gear ratio of the continuously variable transmission. As the continuously variable transmission of this kind, a belt-type continuously variable transmission, and a toroidal type continuously variable transmission are known in the art. In the belt-type continuously variable transmission, a torque is transmitted by a frictional force established at a contacting face between the belt and individual pulleys. Therefore, a contact pressure between the belt and individual pulleys is kept to such a frictional force as corresponding to an input torque, i.e., a torque capacity. Specifically, the contact pressure is secured by clamping the belt by a movable sheave and a fixed sheave so as to exert tension on the belt.

The belt slippage can be avoided by raising the clamping pressure for clamping the belt to increase a transmission torque (i.e., a torque capacity). However, if the clamping pressure is excessively high, transmission efficiency of the power is degraded in the continuously variable transmission, and consumption of the power is increased to establish high oil pressure. For this reason, generally, the clamping pressure is set as low as possible to the extent that the belt slippage does not occur, and varied in accordance with a change in an engine load.

A speed change is carried out in the belt-type continuously variable transmission by changing the groove widths of individual pulleys. Accordingly, a load (i.e., a thrust) is applied to the individual pulleys in an axial direction to carry out the speed change, likewise the load (i.e., the thrust) to establish the clamping pressure. Therefore, according to the prior art, a speed change ratio is arbitrarily set by applying the oil pressure for setting the clamping pressure to the driven pulley, and by applying the oil pressure to the drive pulley which can maintain the clamping force against the oil pressure applied to the driven pulley, while controlling a feeding amount of an operating oil to the drive pulley. Specifically, an oil chamber is provided respectively in the drive and driven pulleys, and the speed change ratio is adjusted steplessly in the belt-type continuously variable transmission by controlling the amount of the operating oil fed to the oil chamber of the drive pulley, and by controlling the oil pressure applied to the oil chamber of the driven pulley.

One example of the belt-type continuously variable transmission of this kind is disclosed in Japanese Patent Laid-Open No. 1994-207658. In the belt-type continuously variable transmission disclosed in Japanese Patent Laid-Open No. 1994-207658, an oil pressure (i.e., a line pressure) relating to a belt tension is feedback-controlled. When the feedback-control is carried out, a delay of the change in the line pressure, in other words, a deviation between a target line pressure and an actual line pressure, is taken into consideration.

In Japanese Patent Laid-Open No. 1997-280361, moreover, there is disclosed a system which carries out a feedback-control of the line pressure by using a target value of an oil pressure (i.e., a line pressure) of a driven pulley which is corrected on the basis of a target value of an oil pressure (i.e., a speed change pressure, or a primary pressure) of a drive pulley at a speed change time.

In Japanese Patent Laid-Open No. 1988-269745, still moreover, there is disclosed a system which alters a control gain of the feedback-control in accordance with the change rate of the speed change ratio, when executing the feedback-control on an oil pressure of the pulley. In Japanese Patent Laid-Open No. 1994-240331, furthermore, there is disclosed a system which carries out a feedback-control of the line pressure when the line pressure is stable, and carries out a feedforward-control of the line pressure when the line pressure is varying.

In the inventions taught by the above-mentioned publications, the oil pressure of the pulley (i.e., the line pressure) in the belt-type continuously variable transmission is appropriately feedback-controlled according to respective constructions. Consequently, convergence of the actual line pressure to the target line pressure, and a control accuracy of the line pressure control at a transient time of the speed change are improved.

Meanwhile, in the control systems for the belt-type continuously variable transmissions of the prior art, the pressure-receiving capacity of the oil chamber in each pulley is varied as a result of displacement of the movable sheave of each pulley at the speed change time. Therefore, a pressure change comes over the oil pressure applied to the oil chamber, and the actual oil pressure is varied temporarily. However, any of the inventions suggested by the above-mentioned publications does not consider the pressure change resulting from the change in the pressure-receiving capacity of the oil chamber at the speed change time. Therefore, the following capability of the actual oil pressure to the target value may be degraded in case of carrying out the feedback control on the oil pressure.

More specifically, in the belt-type continuously variable transmission, the speed change is carried out by varying the groove width of one of the pulleys to which the belt is applied (e.g., the drive-side pulley) so as to change the groove width of another pulley (e.g., the driven-side pulley). Moreover, the clamping pressure of the belt is set to a predetermined pressure by feeding the oil pressure to the oil chamber in the other pulley. For this reason, capacity of the driven-side oil chamber of is changed as a result of the speed change by feeding/discharging the operating oil to/from the oil chamber in the drive-side pulley. Therefore, the change in the pressure-receiving capacity of the driven-side oil chamber impinges on the control of the clamping pressure. In this case, it is also possible to control the oil pressure of the oil chamber for establishing the clamping pressure by the feedforward control. However, the oil pressure is set relatively high so as to improve the following capability of the actual oil pressure to the target value. This may increase power loss and deteriorate durability. In order to solve those problems, the feedback-control on the oil pressure may be carried out. However, since the change in the pressure-receiving capacity impinges on the control accuracy or target following capacity also in this case, a technical improvement is required in order to carry out a pressure control accurately.

SUMMARY OF THE INVENTION

An object of this invention is to provide a control system, which is capable of properly controlling an oil pressure applied to a pulley even when a pressure-receiving capacity is changed as a result of a speed change or the like. More specifically, the object of this invention is to control a pressure for establishing a clamping pressure accurately when carrying out a feedback control on the clamping pressure for clamping a belt, by eliminating influences of disturbance caused by the change in the pressure-receiving capacity of an actuator as far as possible.

According to the present invention, therefore, there is provided a control system for controlling a belt-type continuously variable transmission having a pulley capable of varying its groove width to which a belt is applied, in which the pulley is provided with an oil chamber to which the oil pressure is fed so that the pulley to clamp the belt, and in which the capacity of the oil camber is varied in accordance with the changes in the groove width, and in which the oil pressure in the oil chamber is controlled on the basis of a deviation between a target oil pressure and an actual oil pressure, comprising: a detecting means or a detecting device for detecting changes in the capacity of the oil chamber; and an altering means or an altering device for altering a degree to reflect the deviation on the oil pressure control of the oil chamber on the basis of the change in the capacity. The change in the capacity of the oil chamber is one example of changes in the state quantity resulting from the speed change.

The oil pressure control of the invention includes a feedback control for reflecting the deviation on a control amount of the oil pressure in accordance with a feedback gain, and the alteration of contents of the oil pressure control includes a control for increasing the feedback gain in accordance with the changes in the capacity.

Moreover, the oil pressure control of the invention includes a feedback control in which an integral term proportional to integration of the deviation is included in a calculation of the control amount, and the alteration of contents of the oil pressure control includes a control in which the change in the integral terms suppressed in accordance with the capacity change.

On the other hand, the control system of the present invention is applied to a belt-type continuously variable transmission having a pulley capable of varying its groove width to which a belt is applied, in which the pulley is provided with an oil chamber to which the oil pressure is fed so that the pulley to clamp the belt, and in which the oil pressure in the oil chamber is controlled on the basis of a deviation between a target oil pressure and an actual oil pressure. The control system of the invention comprises a speed change detecting means or a speed change detecting device or a detector for detecting a change in the speed change ratio; and an altering means or device for altering a degree to reflect the deviation on the pressure control of the oil chamber on the basis of changes in the speed change ratio. The change in the capacity of the oil chamber is one example of changes in the state quantity resulting from the speed change.

In this control system, the oil pressure control includes: a feedback control including any one of a proportional action for reflecting the deviation on the control amount of the oil pressure in accordance with a feedback gain, and an integral action for reflecting the integration of the deviation on the control amount of the oil pressure; and the altering means or the altering device for altering the control contents of the oil pressure is constructed to increase the feedback gain in accordance with the changes in the speed change ratio, or to suppress changes in the integral term caused by the integral action. Specifically, there is provided an integration suppressing means or an integration suppressing device. This integration suppressing device may be a suspending device for suspending accumulation of the integral term in case the change in the state quantity reaches or exceeds the preset value. Moreover, there can be provided a holding device for holding the integral value at the instance when the integration is suspended, and for carrying out the feedback control with the held value.

According to the invention, it is possible to fix the integral term to a preset value in case of suppressing the value of the integral term, if the capacity of the oil chamber, or the change rate or change amount of the speed change ratio is larger than a predetermined reference value. Specifically, there is provided a fixing means or a fixing device. The held value may be the value to complement the nonlinear characteristics of the deviation between the target oil pressure and the actual oil pressure.

The belt-type continuously variable transmission to which the invention is applied includes a transmission in which the deviation between a target oil pressure and an actual oil pressure exhibits nonlinear characteristics. In this case, the preset value, at which the value of the integral term is fixed, may be a value to complement the nonlinear characteristics. The value can be derived from a preliminary simulation or experimentation.

The belt-type continuously variable transmission to which the invention is applied is a transmission comprising: at least one pair of pulleys consisting of a pulley capable of varying its groove width to which a belt is applied, and the other pulley in which its groove width is varied in accordance with the change in the groove width of said pulley; and wherein the other pulley is provided with an oil chamber.

According to the invention, therefore, in case the oil pressure applied to the oil chamber in the pulley of the belt-type continuously variable transmission is controlled on the basis of the deviation between the target oil pressure and the actual oil pressure, a degree to reflect the-deviation on the pressure control of the oil chamber is altered in accordance with changes in the pressure-receiving capacity of the oil chamber. Accordingly, it is possible to control the oil pressure to be applied to the pulley appropriately even when the pressure-receiving capacity of the oil chamber is changed as a result of the speed change, and it is possible to avoid deterioration in the following capability of the actual oil pressure to the target oil pressure, by preventing or suppressing overshoot or undershoot of the actual oil pressure to the target oil pressure.

According to the invention, moreover, the feedback gain of the feedback control is increased in accordance with the change in the pressure-receiving capacity of the oil chamber, in case of carrying out the feedback control on the oil pressure applied to the oil chamber on the basis of the deviation between the target oil pressure and the actual oil pressure. Specifically, there is provided an increasing device. The feedback control includes a proportional action to determine a control amount proportional to the deviation. The feedback gain may be a gain of the proportional action. Therefore, even when the deviation becomes large due to the change in the pressure-receiving capacity of the oil chamber resulting from the speed change or the like, the feedback gain is increased so that the response of the control is enhanced. As a result, it is possible to appropriately feedback-control the oil pressure applied to the pulley, thereby avoiding the deterioration of the following capability of the actual oil pressure to the target oil pressure.

According to the invention, furthermore, in case of carrying out the feedback control on the oil pressure applied to the oil chamber on the basis of the deviation between the target oil pressure and the actual oil pressure, the changes in the integral term is suppressed in accordance with the pressure-receiving capacity of the oil chamber. In other words, accumulation of the integral term is restricted. Therefore, changes in the pressure-receiving capacity of the oil chamber resulting from the speed change or the like will not be reflected directly on the feedback control, so that the oil pressure applied to the pulley can be appropriately feedback-controlled. As a result of this, it is possible to avoid the deterioration in the following capability of the actual oil pressure to the target oil pressure, by preventing or suppressing overshoot or undershoot of the actual oil pressure to the target oil pressure.

According to the invention, on the other hand, in case the oil pressure in the oil chamber is controlled on the basis of the deviation between the target oil pressure and the actual oil pressure, a degree to reflect the deviation on the pressure control of the oil chamber is altered in accordance with the changes in the speed change ratio. This alteration can be executed by providing a correction parameter for correcting the deviation or the feedback gain, and altering this correction parameter. Therefore, the oil pressure applied to the pulley can be controlled appropriately at the transient time of the speed change. As a result of this, it is possible to avoid the deterioration in the following capability of the actual oil pressure to the target oil pressure, by preventing or suppressing overshoot or undershoot of the actual oil pressure to the target oil pressure.

According to the invention, still moreover, in case the oil pressure in the oil chamber is feedback-controlled on the basis of the deviation between the target oil pressure and the actual oil pressure, the feedback gain such as a proportional gain of the feedback control is increased or the change in the integral term is suppressed, in accordance with the change in the speed change ratio. Therefore, the oil pressure applied to the pulley can be feedback-controlled appropriately at the transient time of the speed change. As a result of this, it is possible to avoid the deterioration in the following capability of the actual oil pressure to the target oil pressure, by preventing or suppressing overshoot or undershoot of the actual oil pressure to the target oil pressure.

According to the invention, furthermore, in case the change in the capacity of the oil chamber or the changes in the speed change ratio is significant, a value of the integral term for feedback-controlling the actual pressure of the oil chamber is fixed to a preset value. Therefore, the influence of changes in the deviation between the actual oil pressure and the target oil pressure can be suppressed. As a result, it is possible to avoid the deterioration in the following capability of the actual oil pressure to the target oil pressure, by preventing or suppressing overshoot or undershoot of the control amount of the oil pressure.

According to the invention, still moreover, the value of the integral term to be fixed is a supplemental value of the nonlinear characteristics. Therefore, it is possible to avoid the deterioration in the following capability of the actual oil pressure to the target oil pressure, by preventing or suppressing overshoot or undershoot of the control amount of the oil pressure in the oil chamber.

Additionally, according to the invention, it is possible to properly control the oil pressure, i.e., a clamping pressure applied to a driven pulley, even at a transient time of the speed change or when the pressure-receiving capacity is changed, in the belt-type continuously variable transmission in which a speed change ratio is controlled by one of the pulleys (e.g., a drive pulley) and the clamping pressure is controlled by the other pulley (e.g., the driven pulley).

The above and further objects and novel features of the invention will more fully appear from the following detailed description when the same is read with reference to the accompanying drawings. It is to be expressly understood, however, that the drawings are for purpose of illustration only and are not intended as a definition of the limits of the invention.

BRIEF DESCRIPTION OF THE DRAWINGS

FIG. 7 is a time chart for explaining a changing state of the oil pressure (clamping pressure) in which the invention is not implemented.

FIG. 8 is a conceptional diagram showing a power train and a control line of a vehicle to which a control system of the invention is applied.

DETAILED DESCRIPTION OF THE PREFERRED EMBODIMENT

Figure 1:
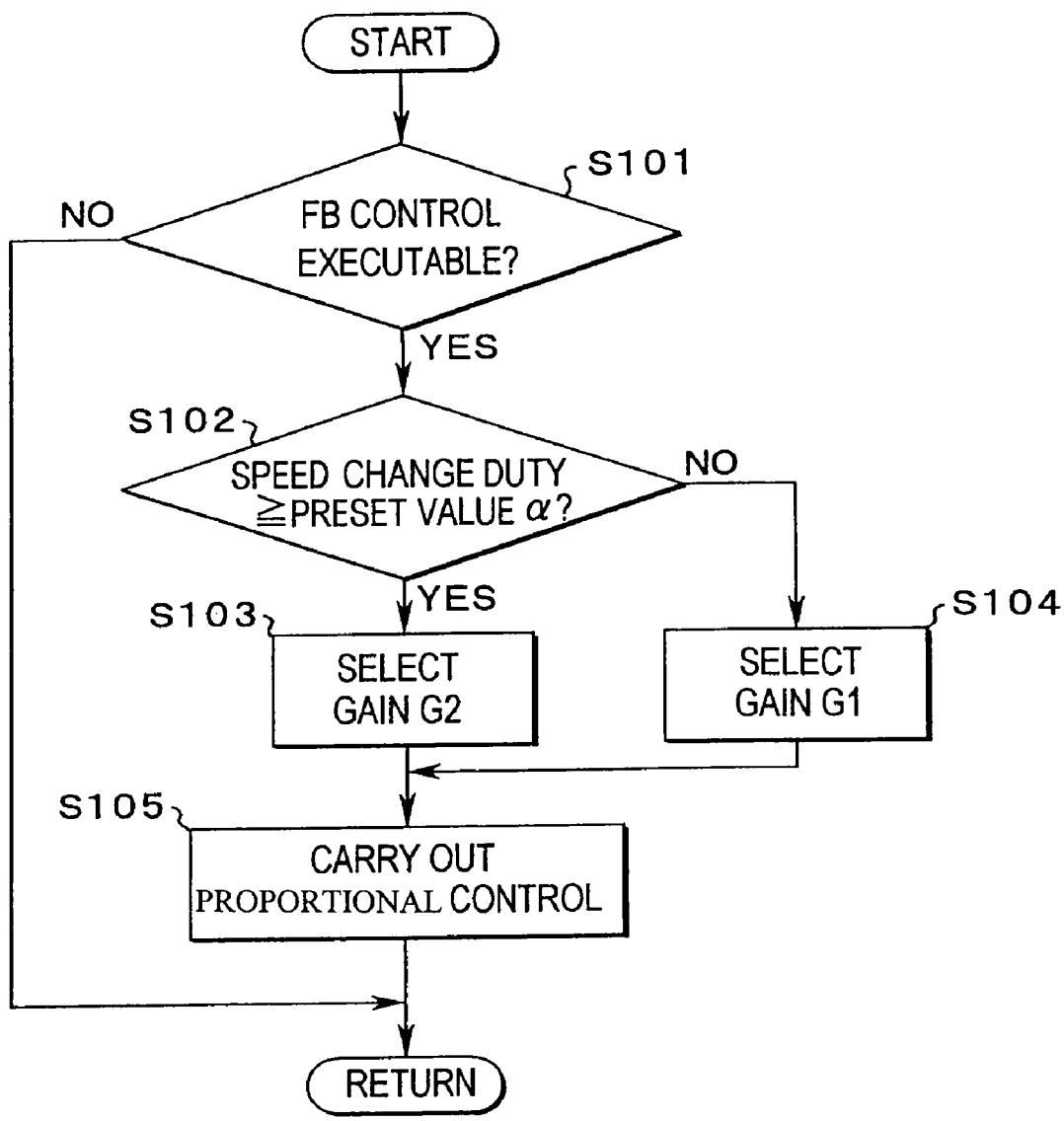
FIG. 1 is a flow chart for explaining a first control example by a control system of this invention.

This invention will be described in connection with its specific examples. First of all, here will be described one example of a drive line including a prime mover and a continuously variable transmission, to which the invention is applied. FIG. 8 schematically shows one example of the drive line including a belt type continuously variable transmission 1. This continuously variable transmission 1 is connected to a prime mover 5 through a forward/backward switching mechanism 2 and through a fluid transmission mechanism 4 having a lockup clutch 3.

The prime mover 5 is constructed of an internal combustion engine, or an internal combustion engine and an electric motor, or an electric motor and so on. In the following description, the prime mover 5 will be called as "engine 5". On the other hand, the fluid transmission mechanism 4 has a similar construction to a torque converter of the background art. Specifically, the fluid transmission mechanism 4 is configured to include: a pump impeller to be rotated by the engine 5; a turbine runner arranged to confront the pump impeller; and a stator interposed between them. A spiral flow of a fluid generated by the pump impeller is fed to the turbine runner, and the turbine runner thereby rotates to transmit the torque.

An inevitable slip occurs between the pump impeller and the turbine runner in the torque transmission through the fluid, and this may be a factor to cause a drop of the power transmission efficiency. In order to remove such a factor, there is provided the lockup clutch 3 for directly connecting an input side member such as the pump impeller and an output side member such as the turbine runner. This lockup clutch 3 is controlled by an oil pressure to be kept in a completely applied state, a completely released state and a slip state or their intermediate state. In addition, the slip speed can be controlled properly.

The forward/backward switching mechanism 2 is adopted in consideration of the fact that the engine 5 is restricted to rotate in one direction, and is configured to output the input torque as it is or in a reversed direction. In the example shown in FIG. 8, a double pinion type planetary gear mechanism is adopted as the forward/backward switching mechanism 2. Specifically, there are arranged a ring gear 7 concentrically with a sun gear 6. Between the sun gear 6 and ring gear 7, there are arranged a pinion gear 8 meshing with the sun gear 6 and another pinion gear 9 meshing with both the pinion gear 8 and the ring gear 7. The pinion gears 8 and 9 are so held by a carrier 10 as to rotate thereon and to revolve around the carrier 10. The forward/backward switching mechanism 2 is further provided with: a forward clutch 11 for connecting two rotary elements (e.g., the sun gear 6 and the carrier 10) integrally; and a backward brake 12 for reversing the direction of the output torque by fixing the ring gear 7 selectively.

The continuously variable transmission 1 has a similar construction to the belt type continuously variable transmission known in the background art, in which a drive pulley 13 and a driven pulley 14 arranged in parallel with each other are respectively composed of a stationary sheave and a movable sheave to be moved back and forth in the axial directions by hydraulic actuators 15 and 16. Therefore, the groove widths of the respective pulleys 13 and 14 are changed as the movable sheaves are axially moved, and the running radii of a belt 17 (or the effective radii of the pulleys 13 and 14) made to run on the respective pulleys 13 and 14 are continuously varied, thereby changing the gear ratio continuously. The drive pulley 13 is connected to the carrier 10 serving as the output element in the forward/backward switching mechanism 2. Here, individual actuators 15 and 16 push the movable sheave toward the stationary sheave side when operating oil is supplied thereto, or when the oil pressure is raised. Accordingly, capacities of respective actuators 15 and 16 are increased as a result of the displacement of the movable sheave to the stationary sheave side.

To the hydraulic actuator 16 in the driven pulley 14, an oil pressure (e.g., a line pressure or its compensating pressure) is fed through the not-shown oil pump and hydraulic control device in accordance with the torque to be inputted to the continuously variable transmission 1. When the individual sheaves in the driven pulley 14 clamp the belt 17, therefore, the belt 17 is tensed to retain the clamping pressure (or the contact pressure) between the individual pulleys 13 and 14 and the belt 17. To the hydraulic actuator 15 in the drive pulley 13, on the contrary, operating oil is fed in accordance with the gear ratio to be set, thereby setting the groove widths (or the effective radii) corresponding to the target gear ratio.

The aforementioned driven pulley 14 is connected through a gear unit 18 to a differential 19, so that the torque is outputted from the differential 19 to drive wheels 20. In the drive mechanism thus far described, therefore, the lockup clutch 3 and the continuously variable transmission 1 are arrayed in tandem between the engine 5 and the drive wheels 20.

There are provided various sensors for detecting the action state (or the running state) of a vehicle mounting the continuously variable transmission 1 and the engine 5 thereon. Specifically, there are provided: a turbine speed sensor 21 for detecting the input speed (i.e., the speed of the aforementioned turbine runner) with respect to the continuously variable transmission 1 to output a signal; an input speed sensor 22 for detecting the speed of the drive pulley 13 to output a signal; an output speed sensor 23 for detecting the speed of the driven pulley 14 to output a signal; and an oil pressure sensor 24 for detecting the pressure of the hydraulic actuator 16 disposed on the side of the driven pulley 14 for establishing the belt clamping pressure. Although not shown, there are also provided: an accelerator opening sensor for detecting the depression of an accelerator pedal to output a signal; a throttle opening sensor for detecting the opening of the throttle valve to output a signal; and a brake sensor for outputting a signal when a brake pedal is depressed.

There is further provided a transmission electronic control unit (CVT-ECU) 25 for performing the controls to apply/release the aforementioned forward clutch 11 and backward brake 12, the control of the clamping pressure of the aforementioned belt 17, the control of the gear ratio, and the control of the lockup clutch 3. This transmission electronic control unit 25 is constructed mainly of, e.g., a microcomputer, which performs operations according to preset programs on the basis of the inputted data and the preliminarily stored data, thereby to: set various states such as forward, reverse or neutral and the clamping pressure demanded; set the gear ratio; engage/release the lockup clutch 3; and control the slip speed or the like.

Here will be exemplified the data (or the signals) inputted to the transmission electronic control unit 25. The signal of an input speed (e.g., an input number of revolutions per minute) Nin of the continuously variable transmission 1, and the signal of an output speed (e.g., an output number of revolutions per minute) No of the continuously variable transmission 1 are inputted from corresponding sensors. On the other hand, there are also inputted the signal of an engine speed Ne, the signal of an engine (E/G) load, the throttle opening signal, the accelerator opening signal indicating the depression of the (not-shown) accelerator pedal and so on from an engine electronic control unit (E/G-ECU) 26 for controlling the engine 5.

The continuously variable transmission 1 can control the engine speed or the input speed steplessly (in other words, continuously) thereby to improve the mileage of the vehicle mounting this transmission thereon. For example: a target drive force is determined on the basis of a demanded drive expressed by the accelerator opening and the vehicle speed; a target output necessary to achieve the target drive force is determined on the basis of the target drive force and the vehicle speed; the engine speed for achieving the target output with an optimum mileage is determined on the basis of a prepared map; and the speed change ratio is controlled to establish the engine speed.

The power transmission efficiency in the continuously variable transmission 1 is so controlled in a satisfactory state that the advantage of the mileage improvement may not be deteriorated. Specifically, the torque capacity, i.e., the belt clamping pressure of the continuously variable transmission 1 is controlled as low as possible within the range in which the target torque determined on the basis of the engine torque can be transmitted, and in which no slip of the belt 17 is caused. For example, the belt clamping pressure is set to relatively high, i.e., to the extent of the line pressure as an initial pressure of the entire hydraulic line to control the continuously variable transmission 1, or its compensating pressure, under the so-called "unsteady" running state in which an acceleration/deceleration is made comparatively frequently or in which a road has roughness or inequalities.

On the other hand, under the steady running state where the vehicle is running faster than a certain level on a flat road, or under the quasi-steady running state, the belt clamping pressure is lowered gradually so as to detect a minimal pressure that transmits the input torque without causing a slip, in other words, a limit clamping pressure. The belt clamping pressure is set by adding the preset safety factor or the pressure for setting a margin transmission torque for the slip to the detected limit clamping pressure. It is desirable to set the belt clamping pressure in the continuously variable transmission as low as possible within the range in which the torque can be transmitted without slip.

Here, a theoretical clamping pressure Pt corresponding to an input torque Tin to the continuously variable transmission 1 is expressed by the following Formula:

$$Pt=Tin \cdot \cos \theta/(2 \cdot \mu \cdot Rin-A \text{ out}).$$

Here, θ designates the included angle of the belt 17 with the pulleys 13 and 14; μ designates the friction coefficient between the pulleys 13 and 14 and the belt 17; and Rin, which is also possible to obtain from the speed change ratio, designates the running radii of the belt 17 on the drive pulley 13. Furthermore, Aout designates the pressure-receiving capacity of an actuator 16 of the driven pulley 14 side. Accordingly, under the steady running state or the quasi-steady running state, the theoretical clamping pressure Pt, or the product of the theoretical clamping pressure Pt and the preset safety factor represents the target pressure (or the target oil pressure) of the actuator 16 of the driven pulley 14 side. Here, under the steady running state, the aforementioned line pressure or its compensating pressure represents the target pressure (or the target oil pressure).

As has been described above, in the conventional belt-type continuously variable transmission, the pressure-receiving capacity of the oil chamber in each pulley is varied as a result of displacement of the movable sheave of each pulleys 13 and 14 at the speed change time. Therefore, a pressure change comes over the oil pressure applied to the oil chamber, and the actual oil pressure is varied temporarily. At this time, if the feedback control is carried out without considering the pressure change resulting from the change in the pressure-receiving capacity of the oil chamber at the speed change time, the following capability of the control may be degraded and the overshoot and undershoot may occur after the speed change. Here, the feedback control is a known control method for determining the control amount of the oil pressure on the basis of the deviation between the actual oil pressure and the target oil pressure, so as to conform those pressures. The feedback control can be exemplified by PI control including a proportional term (or a proportional action) and an integral term (or an integral action), or PID control further including a derivative term (or derivative action).

For example, as shown in the time chart of FIG. 7, when the speed change of the continuously variable transmission 1 is commenced by a speed change command, an oil pressure (or a clamping pressure) command value is changed to establish the clamping pressure corresponding to the speed change ratio to be set. At this time, the actual oil pressure starts changing with an unavoidable control delay (i.e., a dead period) with respect to the oil pressure command value. In this case, if a proportional gain (i.e., the feedback gain) of the feedback control is set stable as in the conventional way, regardless of changes in the oil pressure command value and the speed change ratio, the following capability of the actual value (i.e., the actual oil pressure (clamping pressure)) to the target value of the feedback control is degraded. Consequently, the deviation between the target value and the actual value (in this case, a steady-state deviation or a residual deviation resulting from the proportional action) may be wide (ref. ranges C and D in FIG. 7).

Moreover, if the integral term of the integral action of the feedback control is kept accumulating continuously, the integral term is increased or decreased (i.e., increased in terms of an absolute value) in order to suppress widening of the deviation. As a result of this, the actual value exceeds or falls below the target value to cause undershoot or overshoot (ref. ranges E and F in FIG. 7). Therefore, the control system of this invention is configured to execute the controls, as will be described hereinafter.

FIG. 1 is a flow chart showing the first control example of the invention. A routine shown in this flow chart is carried out repeatedly every preset short time period. In FIG. 1, first of all, it is judged (at Step S101) whether or not the feedback control of a hydraulic control device can be carried out in the continuously variable transmission 1. A condition or a criterion of the judgment to carry out the feedback control is that all the following conditions are satisfied: (i) a shift position is in a drive range; (ii) there is no failure in a pressure sensor and a hydraulic circuit; and (iii) hydraulic characteristics of the hydraulic circuit has been learned; and so on.

The above mentioned execution condition is not satisfied so that the answer of Step S101 is NO, the routine is once ended without any particular control. On the contrary, the execution condition is satisfied so that the answer of Step S101 is YES, the routine advances to Step S102 and it is judged whether or not a "speed-change-duty" (an absolute value) as a speed change command indicates a preset value a or larger. Here, in this invention, the word "speed-change-duty" is defined as a duty command value for a not shown duty solenoid valve for controlling the speed change ratio, which is to be used hereinafter. Specifically, in the continuously variable transmission 1, the actuator 15 of the drive pulley 13 side is controlled by the duty solenoid valve. For example, there are provided an upshifting duty solenoid valve for feeding the operating oil, and a downshifting duty solenoid valve for discharging the operating oil. If a duty ratio as a command value for the upshifting duty solenoid valve is increased, a flow rate of the operating oil is increased so that an upshifting is carried out quickly. On the other hand, if a duty ratio as a command value for the downshifting duty solenoid valve is increased, a discharging rate of the operating oil is increased so that a downshifting is carried out quickly. Specifically, the speed-change-duty is one of the elements of physical quantity or state quantity associated with the speed change. Another state quantity possible to be adopted instead of the speed-change-duty is, e.g., an actual speed of the speed change, a displacement speed of the sheave or the like.

The speed-change-duty indicates the preset value a or larger so that the answer of step S102 is YES, the routine advances to Step S103 and a gain G2 is selected and set as the proportional gain (i.e., the feedback gain) of a proportional action in the feedback control. The gain G2 is the proportional gain which is preliminary set larger than the below-mentioned gain G1.

When the large speed-change-duty is outputted as the command, the operating oil is rapidly fed to the actuator 15 of the drive pulley 13 for setting the speed change ratio, or rapidly discharged therefrom on the contrary. As a result of this, the speed change is achieved quickly. On the other hand, the oil pressure command value (i.e., a commend value for setting the target oil pressure or the target clamping pressure) for establishing the clamping pressure corresponding to the speed change ratio is outputted. As described above, in the continuously variable transmission 1, the speed change is carried out by changing the groove width of the drive pulley 13 to change the running radii of the belt 17 on the drive pulleys 13 and 14. Therefore, the movable sheave of the driven pulley 14 is moved in consequence of the change in the groove width of the drive pulley 13. As a result, the capacity (i.e., the pressure-receiving capacity) of the actuator 16 on the driven pulley 14 side is changed. In addition, an unavoidable response delay occurs in the oil pressure control of the actuator 16 to establish the clamping pressure. For this reason, in the transient state of the speed change, the deviation between the actual oil pressure of the actuator 16 and the target oil pressure becomes wider. Specifically, the larger the speed-change-duty is, in other word, the higher the execution speed of speed change is, the wider the deviation thereof becomes.

Thus, if the speed-change-duty is large, the change in the oil pressure, the pressure-receiving capacity, or the speed change ratio becomes substantial. This makes it difficult for the actual value to follow the target value in the feedback control of the clamping pressure. As a result, the deviation between the target value and the actual value becomes wide. For this reason, in the control at Step S103, when the speed-change-duty indicates the preset value a or larger, the proportional gain is increased (in other words, gain G2 is selected) to enhance the response of the control. Consequently, the deterioration in the following capability of the control is prevented or suppressed.

On the contrary, the speed-change-duty is smaller than the preset value a so that the answer of step S102 is NO, the routine advances to Step S104 and the gain G1 which is smaller than the gain G2 is selected and set as the proportional gain of the proportional action in the feedback control. This is the case in which the speed-change-duty is large so that the deviation between the target value and the actual value is wide. Contrary to the above-mentioned case, in case the speed-change-duty is small, the response of the control becomes excessive if the proportional gain is excessively large. This often causes overshoot and undershoot, and a hunting of the control may occur. For this reason, the response to the control is lowered until the speed-change-duty exceeds the preset value a, by relatively lowering the proportional gain (i.e., by selecting the gain G1). Thus, the hunting of the control is prevented or suppressed.

After the proportional gain of the proportional action in the feedback control is set to the gain G1 or G2 at Steps S103 or S104, the proportional action of the feedback control is carried out (at Step S105). Then the routine is once ended.

Thus, the hunting of the control can be prevented or suppressed by selecting the proportional gain from the gain G2 having a larger value and the gain G1 having a smaller value, and by setting the proportional gain to the selected gain, in accordance with the change in speed-change-duty, in other words, the change in the pressure-receiving capacity or the speed change ratio. Therefore, it is possible to avoid the deterioration in the following capability of the control.

Figure 2:
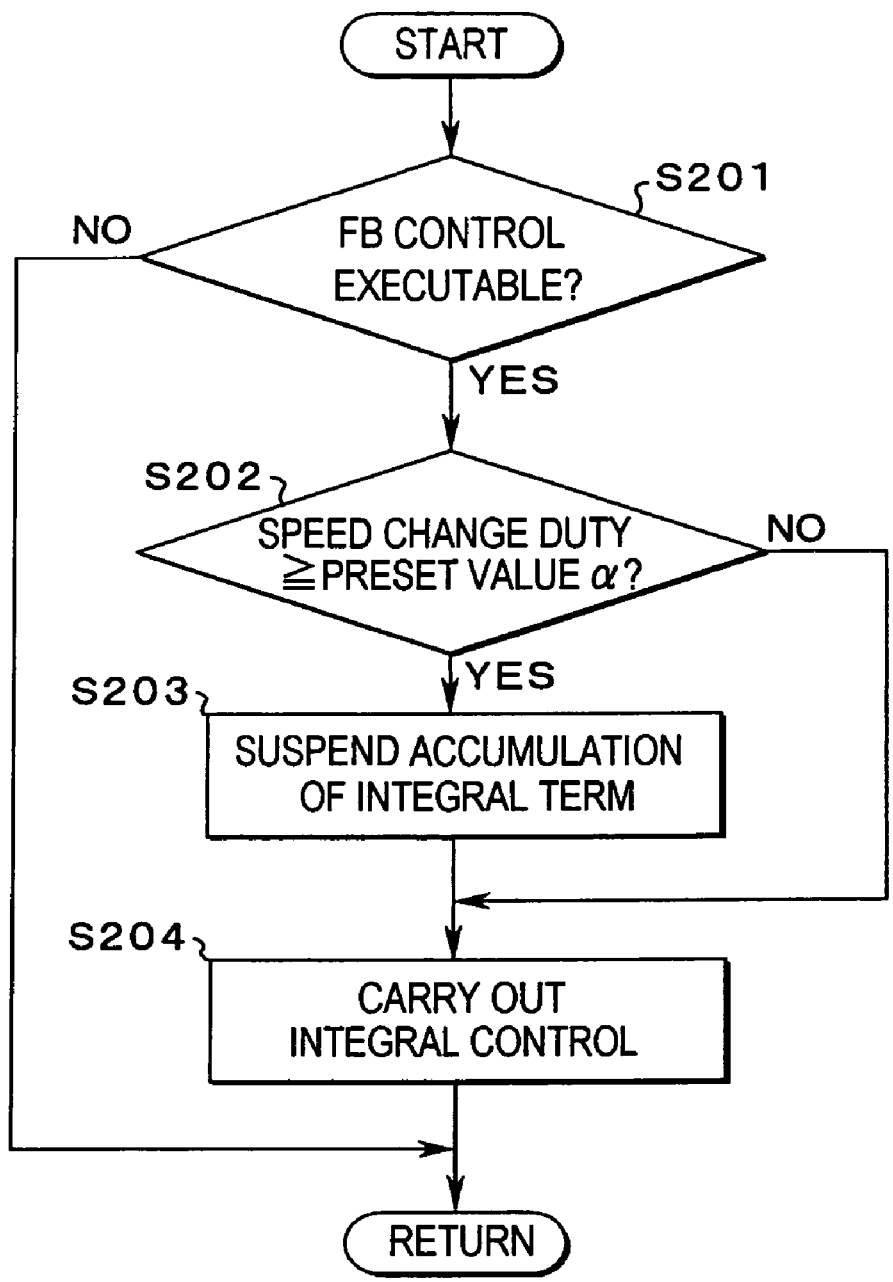
FIG. 2 is a flow chart for explaining a second control example by a control system of this invention.

FIG. 2 is a flow chart showing the second control example of the invention. As the flowchart in FIG. 1, first of all, it is judged (at Step S201) whether or not the feedback control of the hydraulic control device is possible to be carried out in the continuously variable transmission 1. In case the execution condition is not satisfied so that the answer of Step S201 is NO, the routine is once ended without any particular control.

On the contrary, in case the execution condition is satisfied so that the answer of Step S201 is YES, the routine advances to Step S202, and it is judged whether or not the speed-change-duty (an absolute value) as a speed change command indicates the preset value a or larger. The speed-change-duty indicates the preset value a or larger so that the answer of step S202 is YES, the routine advances to Step S203, and accumulation of the integral term of the feedback control is suspended. Then, the integral action of the feedback control is carried out (at Step S204). Specifically, the feedback control including the integral term is carried out on the oil pressure.

The integral action of the feedback control is an action to eliminate the residual deviation caused by the proportional action. When the deviation between the target value and the actual value becomes wide, the integral term of the integral action is increased or decreased so as to eliminate the deviation immediately. However, as the aforementioned control example shown in FIG. 1, if the proportional gain of the proportional action of the feedback control is increased due to the widening deviation, and the accumulation of the integral term of the integral action is kept accumulating continuously even when the deviation becomes small subsequently, the integral action is carried out with an inappropriate integral term. This may cause undershoot and overshoot. For this reason, according to the control of these Steps S203 and S204, in case the speed-change-duty indicates the preset value a or larger, the degree to reflect the integral term in the control command value (i.e., the degree to reflect a transitional state) is decreased by suspending the accumulation of the integral term and carrying out the integral action. Overshoot and undershoot of the control amount is consequently prevented or suppressed.

On the contrary, the speed-change-duty is smaller than the preset value a so that the answer of step S202 is NO, the routine skips the control of Step S203 and advances to the aforementioned Step S204 to carry out the control thereof. In other words, the integral action of the feedback control is executed without suspending the accumulation of the integral term. Then, the routine is once ended.

Figure 3:
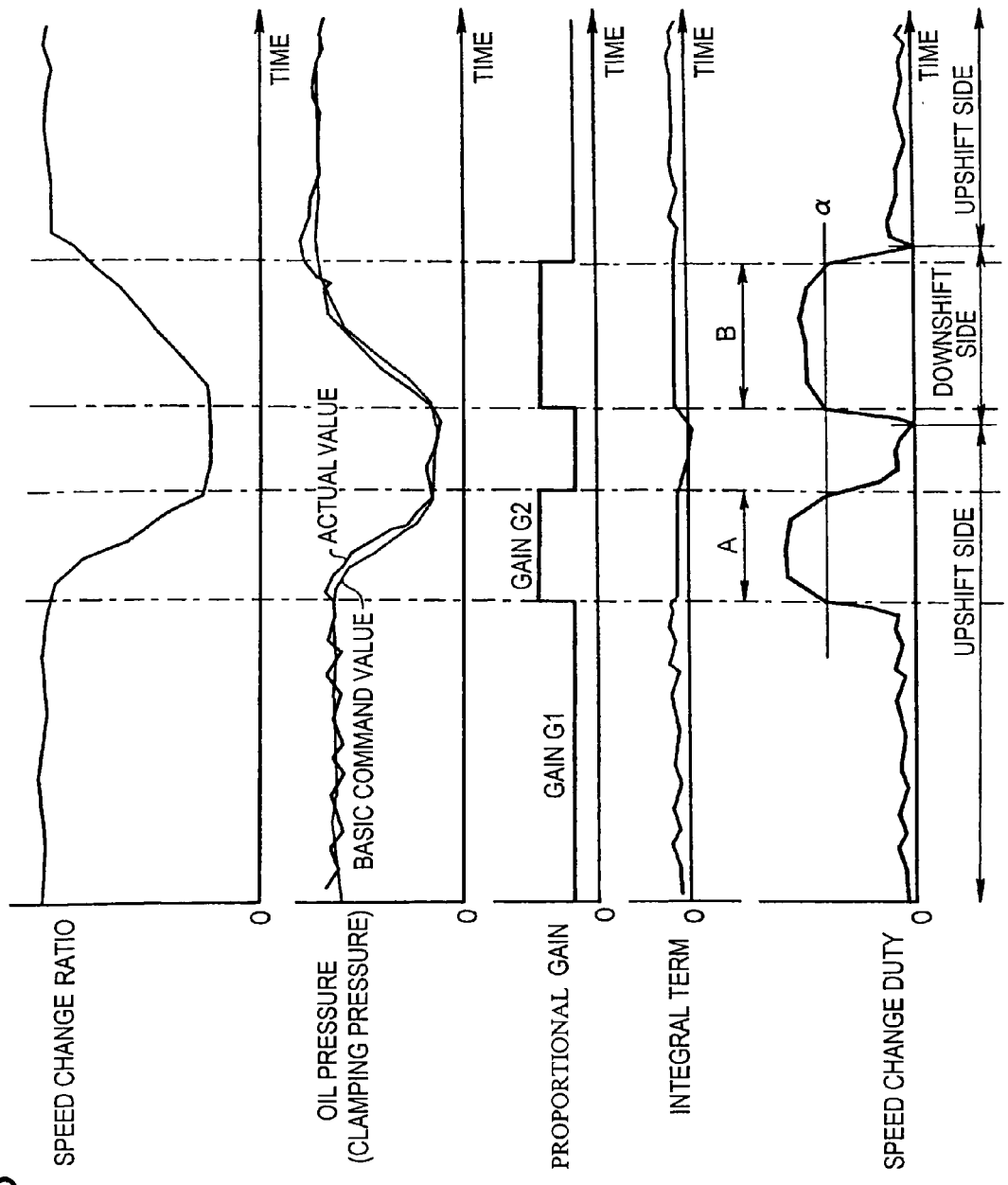
FIG. 3 is a time chart corresponding to control examples of FIGS. 1 and 2.

FIG. 3 is a time chart schematically showing the changes in the speed change ratio and the oil pressure (or the clamping pressure) of the continuously variable transmission 1 corresponding to the change in the speed-change-duty, in case of carrying out the controls shown in FIGS. 1 and 2. When the speed change command is outputted and the speed-change-duty is increased, the oil pressure command value (or a basic command value) is changed. At this time, the actual oil pressure starts changing with an unavoidable control delay (i.e., a dead period) with respect to the oil pressure command value.

As has been described above, if the proportional gain (i.e., the feedback gain) is set constant regardless of the change in the speed-change-duty, the following capability of the actual value to the target value may be degraded. However, in this control example, there is provided the preset value α as a threshold to determine the degree of the change in the speed-change-duty. In case the speed-change-duty is the preset value α or larger (ref. zones A and B in FIG. 3), the proportional gain is altered from the currently set gain G1 to the gain G2 having a larger value than the gain G1. As a result, the response of the control is enhanced. Therefore, the actual value is controlled to approximate to the target value promptly even when the deviation between the target value and the actual value becomes wide due to the control delay (i.e., a dead period). Consequently, the deterioration in the following capability of the control is prevented or suppressed.

In case the speed-change-duty is the preset value a or larger, moreover, the proportional gain is altered from the gain G1 to the gain G2, and the accumulation of the integral term of the integral action of the feedback control is suspended. As described above, in case the deviation becomes wide and the proportional gain is increased, the degree to reflect the integral term on the control command value is decreased by suspending the accumulation of the integral term and carrying out the integral action. As a result, overshoot and undershoot of the control amount is prevented or suppressed so that the hunting of the control is prevented or suppressed.

Thus, the hunting of the control can be prevented or suppressed as a result of carrying out the integral action by suspending (i.e., suppressing the change in the integral term) and continuing the accumulation of the integral term of the feedback control, in accordance with the change in speed-change-duty, in other words, the change in the pressure-receiving capacity or the speed change ratio. Therefore, it is possible to avoid the deterioration in the following capability of the control.

As has been described, when controlling the oil pressure to be applied to the oil chambers arranged in each pulleys 13 and 14 of the continuously variable transmission 1 on the basis of the deviation between the target oil pressure and the actual oil pressure, the degree to reflect the deviation on the pressure control of the oil chamber is altered on the basis of the change in the pressure-receiving capacity of the oil chamber or the change in the speed change ratio. Specifically, when feedback-controlling the oil pressure of the oil chamber, the feedback gain is increased in accordance with the change in the pressure-receiving capacity of the oil chamber or the change in the speed change ratio. For example, the larger the change (including width change, rate change and so on) in the pressure-receiving capacity (or the speed change command or the speed of the speed change) is, or the larger the change (including width change, rate change and so on) in the speed change ratio (or the speed change command or the speed of the speed change) is, the more the feedback gain is increased. Otherwise, when feedback-controlling the oil pressure of the oil chamber, the change in the integral term of the feedback control is suppressed in accordance with the change in the pressure-receiving capacity of the oil chamber or the change in the speed change ratio. For example, the larger the change (including width change, change rate and so on) in the pressure-receiving capacity (or the speed change command or the speed of the speed change), or the larger the change (including width change, change rate and so on) in the speed change ratio (or the speed change command or the speed of the speed change) is, the less the change in the integral term of the feedback control is made. Therefore, it is possible to properly control the oil pressure applied to the pulley in response to the change in the pressure-receiving capacity of the oil chamber or the change in the speed change ratio resulting from the speed change and so on. As a result, the deterioration in the following capability of the actual oil pressure to the target oil pressure can be avoided by preventing or suppressing occurring of overshooting or undershooting of the actual oil pressure to the target oil pressure.

In the above-mentioned control example, the accumulation of the integral term is suspended in case the speed-change-duty (the absolute value) is the preset value α or larger. Accordingly, the value of the integral term indicates the value just before the suspension of accumulation. On the other hand, the deviation at the transient time of the speed change between the target value and the actual value of the oil pressure for establishing the clamping pressure differs depending on the individual deference of the belt-type continuously variable transmission or the hydraulic control device thereof. In most cases, tendency of the change exhibits nonlinear characteristics. Therefore, an integrated value of the integral term, which is held by suspending the accumulation of the integral term, does not necessarily reflect actual characteristics.

Figure 4:
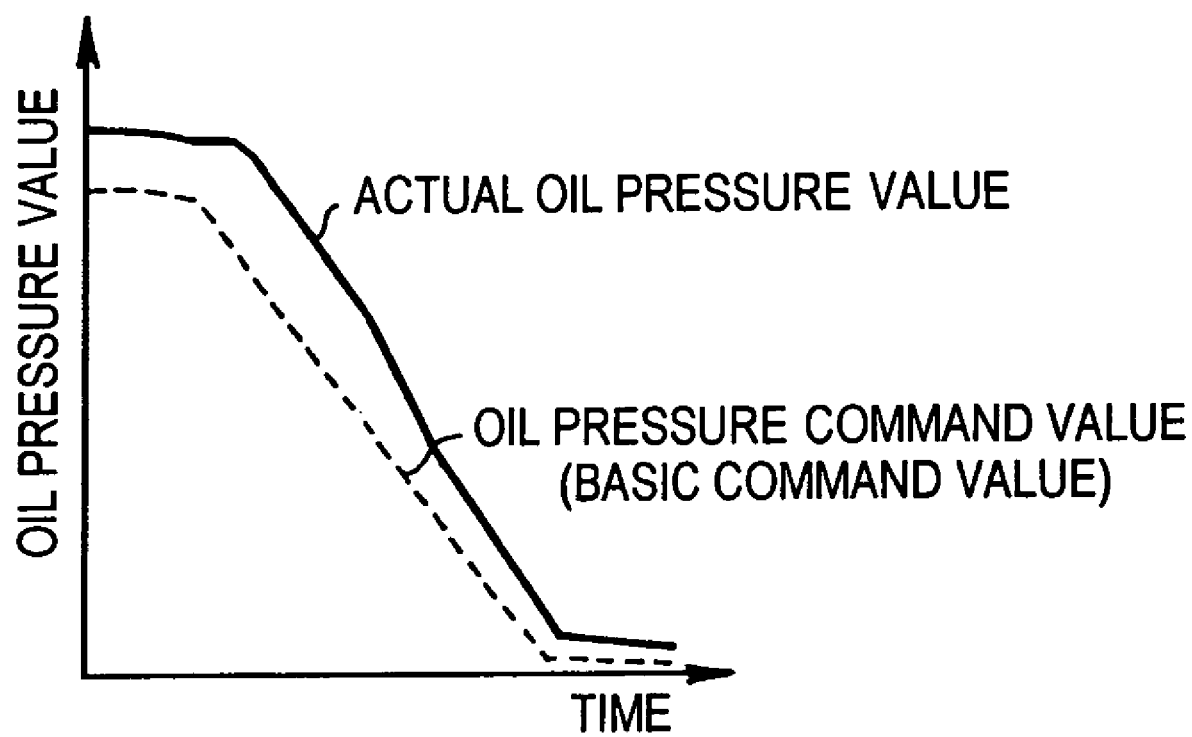
FIG. 4 is a diagram showing nonlinear characteristics of an actual oil pressure value with respect to a command value of the oil pressure.

FIG. 4 specifically shows one example of tendency of the change in the deviation between the target value and the actual oil pressure value. There is illustrated the change in the oil pressure command value for the actuator 16 of the driven pulley 14 side at the transient state of upshifting, and the change in the actual value of the oil pressure. Since the oil pressure command is a value corresponding to the aforementioned theoretical clamping pressure, it is decreased when carrying out the upshift. FIG. 4 indicates the changes by a broken line. On the other hand, as indicated by a solid line, the actual oil pressure hovers above the oil pressure command value. In case of upshifting, the groove width of the driven pulley 14 is extended as a result of narrowing the groove width of the driven pulley 13. This causes an action to discharge the operating oil compulsory. This action is caused as a result of decrease in the pressure-receiving capacity of the actuator 16 so that the operating oil is compressed. Therefore, the actual oil pressure value is relatively higher than the command value.

However, the oil pressure command for lowering the clamping pressure is outputted in the course of the upshifting, so that the actual oil pressure value approximates the oil pressure command value gradually and the deviation becomes small. This kind of tendency of the deviation toward decreasing depends upon characteristics of the construction of a not shown oil passage and a control valve, therefore, it is necessary to control the oil pressure for establishing the clamping pressure with taking into consideration the deviation to some extent. Accordingly, the integrated value of the integral term, which is set by suspending the accumulation, becomes excessively small or excessively large according to the magnitude of the deviation. This may cause the undershooting or the overshooting of the control amount of the oil pressure.

Figure 5:
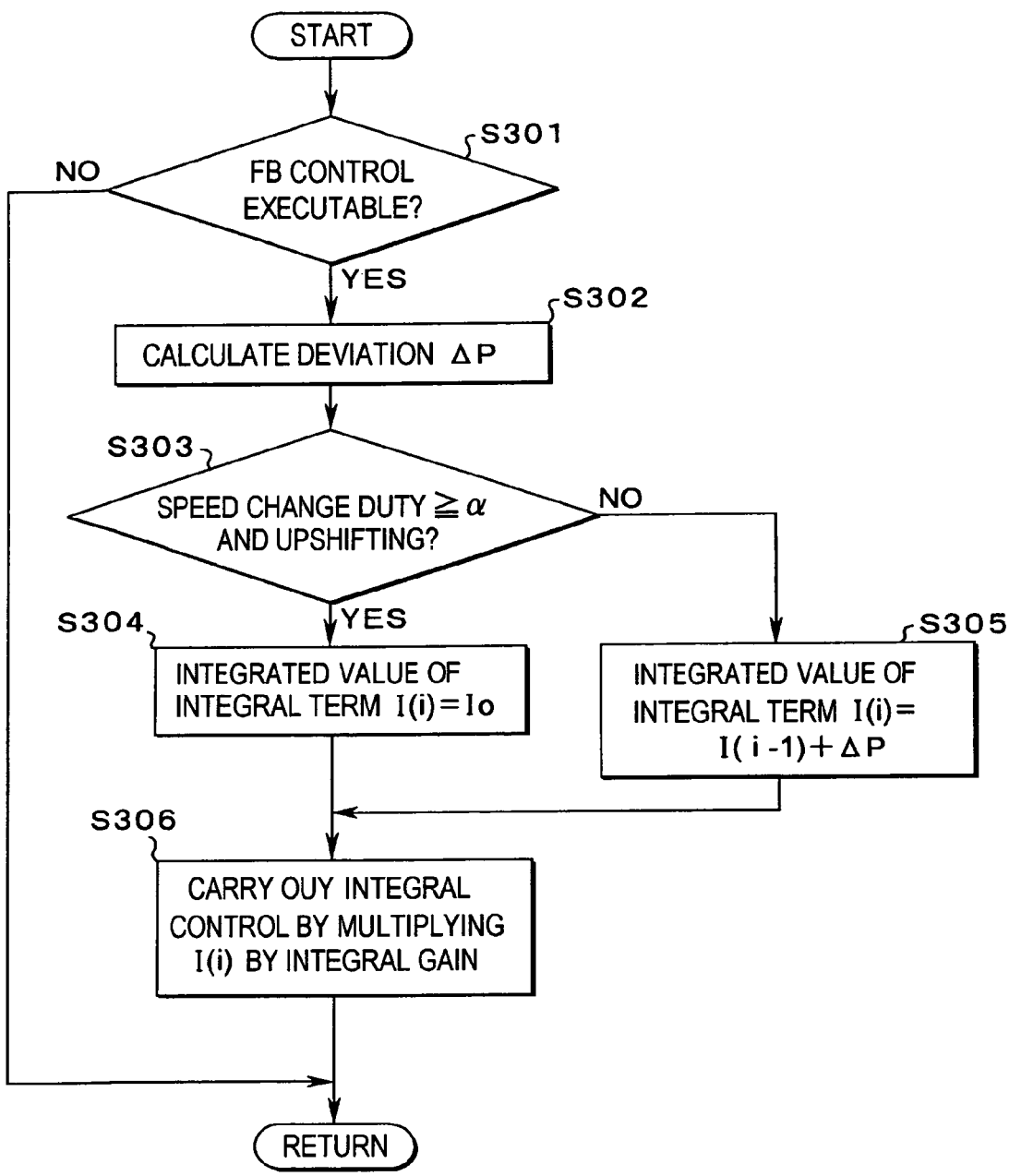
FIG. 5 is a flow chart for explaining a third control example by a control system of this invention.

According to the invention, therefore, it is possible to set the value of the integral term so as to complement the nonlinear characteristics of the aforementioned deviation between the oil pressure command value and the actual oil pressure value. The example is shown in the flowchart of FIG. 5. In the example shown in FIG. 5, first of all, it is judged (at Step S301) whether or not the feedback control (i.e., the FB control) of the oil pressure is possible to be carried out. This is a judging step similar to aforementioned Step S101 shown in FIG. 1 and Step S201 shown in FIG. 2. In case the answer of Step S301 is NO, the routine is once ended without carrying out any especial control.

On the contrary, in case the answer of Step S301 is YES, a deviation ΔP between the oil pressure command value and the actual oil pressure value is figured out (at Step S302). The oil pressure command value can be derived from: the running radius Rin of the belt 17 on the drive pulley 13 obtained from the speed change ratio; and the theoretical clamping pressure calculated on the basis of the input torque Tin and so on. Also, the actual oil pressure value can be obtained on the basis of a detected value detected by a sensor. As described above, the pressure of the actuator 16 of the driven pulley 14 side for establishing the clamping pressure is higher than the target oil pressure (i.e., the oil pressure command value) at the upshifting time, and lower than the target oil pressure at the downshifting time. Therefore, the deviation ΔP obtained at Step S302 is used for judging whether the speed change is upshift or downshift.

Next, it is judged (at Step S303) whether or not the speed-change-duty is the preset value α as criterion of the judgment is larger, and whether or not the deviation ΔP is a negative value. In other words, it is judged the speed of the speed change is fast and whether or not the speed change is upshift. In case the answer of Step S303 is YES, the pressure of the actuator 16 of the driven pulley 14 side is influenced substantially by the change in the pressure-receiving capacity of the actuator 16 resulting from the speed change. Therefore, the integrated value of the integral term I(i) of the feedback control of the pressure is fixed to a preset value Io (at Step S304).

This preset value Io is a value, which is set as the integrated value of the integral term, so as to complement the nonlinear characteristics of the aforementioned deviation ΔP between the oil pressure command value for establishing the clamping pressure and the actual oil pressure. In other words, it is a design value which is set in advance. Here, the preset value Io may be both a steady value and a variable value which varies in accordance with the value of the speed-change-duty.

On the contrary, the speed-change-duty is smaller than the preset value α or the speed change is not upshift so that the answer of Step S303 is NO, the accumulation of the integrated value of the integral term is continued (at Step S305). Because the change in the pressure-receiving capacity of the actuator 16 of the driven pulley 14 side is mild so that the change in the pressure-receiving capacity does not especially impinge on the oil pressure for establishing the clamping pressure. Moreover, in case of downshifting, the oil pressure is raised in consequence of the change in the pressure-receiving capacity. Therefore, the change in the pressure-receiving capacity is not a problem in terms of avoiding a belt slippage.

Then, the feedback control of the oil pressure is carried out (at Step S306). This feedback control of the oil pressure includes the integral action (i.e, an integral control), in which the integral term obtained at Steps S304 and S305 is multiplied by a preset integral gain.

Figure 6:
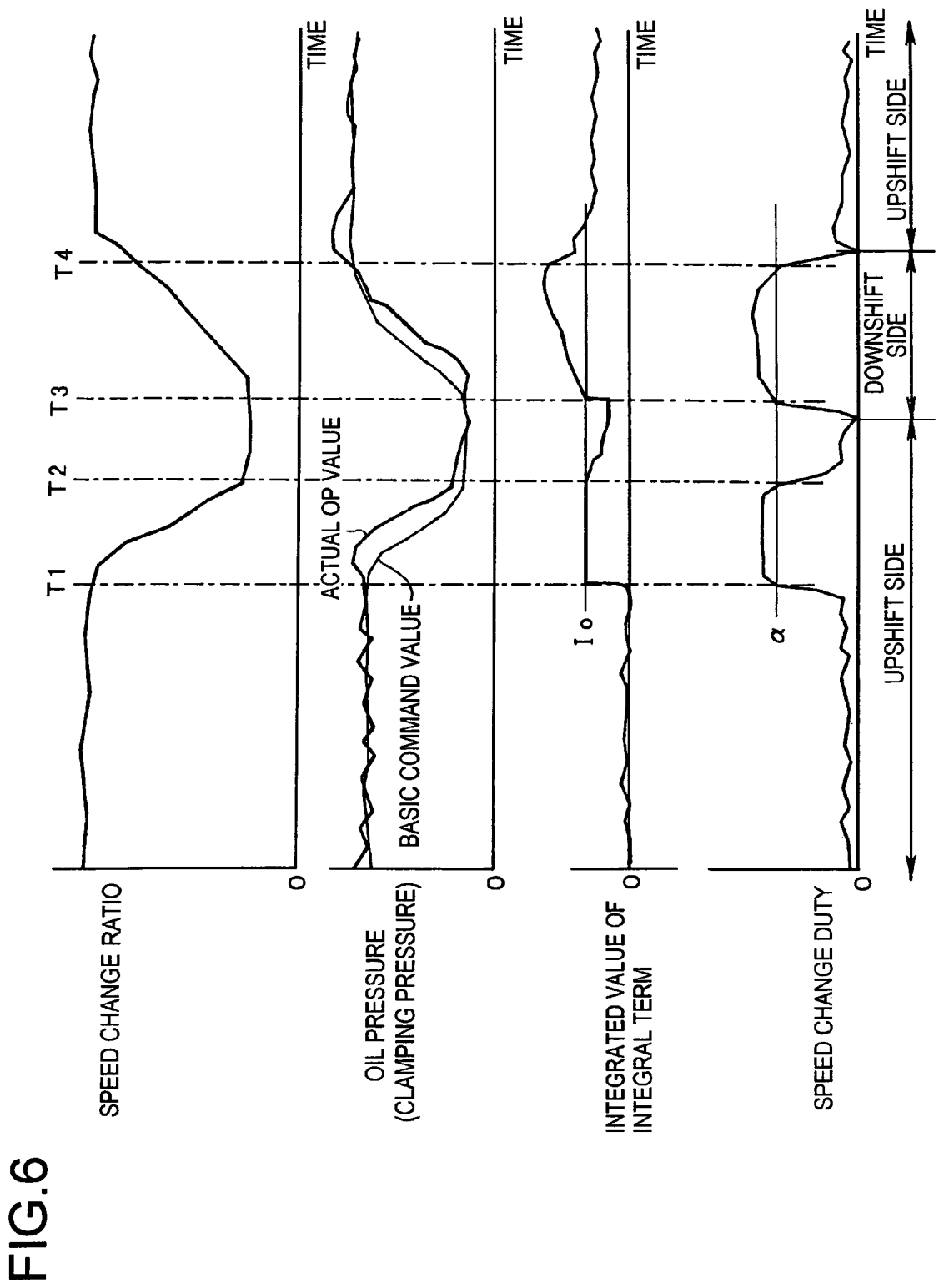
FIG. 6 is a time chart corresponding to control example of FIG. 5.

FIG. 6 is a time chart showing the changes in the speed-change-duty, the integrated value of the integral term, the oil pressure (or the clamping pressure), and the speed change ratio, in case of carrying out the control shown in FIG. 5. When the speed-change-duty increases abruptly from the state of slight upshifting and reaches or exceeds the preset value α (at a point of time T1), the integrated value of the integral term I(i) is fixed to the preset value Io. Also, the pressure-receiving capacity of the actuator 16 of the driven pulley 14 side is reduced compulsory in consequence of the abrupt upshifting. As a result of this, the oil pressure rises with respect to the oil pressure command value (or the basic command value), and the preset deviation ΔP is caused. Moreover, due to the fact that the speed-change-duty is outputted, the speed change ratio is reduced gradually. Additionally, the basic command value shown in FIG. 6 means a command value of the oil pressure for establishing the clamping pressure obtained from the input torque, the speed change ratio and so on, and this does not mean the control command value of the feedback control.

The speed-change-duty is reduced when the speed change ratio approximate the target speed change ratio, or when an input speed of the belt type continuously variable transmission 1 approximate a target input speed. As a result, the control to fix the integrated value of the integral term to the preset value Io is lifted and the accumulation of the integral term is started again, when the speed-change-duty becomes smaller than the preset value α (at a point of time T2).

The deviation ΔP appearing from the point of time T1 to the point of time T2 exhibits the nonlinear characteristics resulting from the individual deference of devices or the like, and the rise in the oil pressure resulting from the change in the pressure-receiving capacity of the actuator 16 at the upshifting time is reflected therein. The aforementioned preset value Io is so set as to complement the nonlinear characteristics of the deviation ΔP without being based on the deviation ΔP. Therefore, the control amount of the feedback control will not be excessive as of the point of time T2. As a result of this, the actual oil pressure value changes substantially in accordance with the oil pressure command value (or the basic command value), so that the overshooting (i.e., undershooting in which the actual oil pressure value drops significantly) is avoided or suppressed. In other words, it is possible to improve the following capability of the actual oil pressure with respect to the target oil pressure.

After this, when a downshifting command is outputted by depressing a not shown accelerator pedal etc., and the speed-change-duty reaches or exceeds the preset value α (at a point of time T3), the speed change ratio increases. This is achieved by widening the groove width of the driven pulley 14 to reduce the running radius of the belt 17. Therefore, the pressure-receiving capacity of the actuator 16 of the driven pulley 14 side is increased as a result of reduction in the groove width of the driven pulley 14. For this reason, the actual oil pressure value becomes lower in comparison with the basic command value. Namely, the deviation ΔP between the actual oil pressure and the oil pressure command value becomes wider. In this case, the accumulation of the integral term is continued according to the examples shown in FIGS. 5 and 6.

Accordingly, the integrated value of the integral term becomes large in case of downshifting wherein the speed-change-duty is large. Therefore, a large steady-state deviation remains in the control even after the speed change ratio approximates the target speed change ratio and the speed-change-duty becomes smaller than the preset value α (at a point of time T4). As a result of this, the feedback control is carried out to further raise the actual oil pressure. This causes the overshooting of the control amount, in which the actual oil pressure exceeds the oil pressure command value (or the basic command value) temporarily, as shown in FIG. 6. However, this increases the clamping pressure so that there is almost no possibility to cause the slippage of the belt 17. Hence this overshooting is within an allowable range from a practical standpoint.

Here, the overshooting of the oil pressure control in a direction to raise the clamping pressure increases a load on the belt 17 and individual pulleys 13 and 14. In order to improve durability, therefore, it is preferable to suppress this sort of overshooting. For this purpose, it is applicable to carry out the control to fix the integrated value of the integral term to an appropriate value also in case of downshifting, as the aforementioned case of upshifting.

Here will be briefly described the relations between the aforementioned specific example and this invention. The electronic control unit 25 for carrying out the aforementioned Steps S102, S202 and S303 corresponds to a pressure-receiving capacity change detecting means or the speed change detecting means of the invention, or a pressure-receiving capacity change detecting device or the speed change detecting device of the invention. Also, the electronic control unit 25 for carrying out the aforementioned Steps S103, S104, S203, S304 and S306 corresponds to an oil pressure control contents altering means for altering the contents of the oil pressure control, or altering device of the invention. Moreover, the electronic control unit 25 for carrying out the aforementioned Steps S203 and S304 corresponds to a means for suppressing accumulation of the integral term, or suppressing device of the invention.

Here, this invention should not be limited to the specific examples thus far described. In the aforementioned examples, individual proportional gains (i.e., the feedback gain) of the gains G1 and G2, which are selected in accordance with the magnitude of the speed-change-duty, is the preset value. However, those gains may be variable values according to the situation. For example, those gains may be obtained by a calculation or from a map, on the basis of the change in the speed-change-duty.

Moreover, in the aforementioned examples, the degree to reflect the integral term in the control command value is decreased by suspending the accumulation of the integral term and carrying out the integral action. However, the degree to reflect the integral term in the control command value may also be decreased by correcting the integral term or by altering the accumulating amount of the integral term. In other words, according to the invention, the degree to reflect the change in the pressure-receiving capacity in the oil pressure control may also be altered by newly implementing a correction parameter for those values, or a correction parameter for correcting the deviation to be used for the proportional action or the integral action, and by altering or setting the correction parameter on the basis of data indicating the situation of the speed change such as the speed-change-duty, instead of altering or fixing the gain or the integration used in the proportional action or the integral action of the feedback control.

What is claimed is:

1. A control system for controlling a belt-type continuously variable transmission having a pair of pulleys including a first pulley which sets a speed change ratio and a second pulley which sets a clamping pressure for clamping the belt, in which the first pulley is provided with a first oil chamber to which an oil pressure is fed to reduce a groove width of the first pulley, in which the second pulley is provided with a second oil chamber to which an oil pressure is fed to clamp the belt and a capacity of the second oil chamber is varied in accordance with a change in the groove width of the first pulley, and in which the oil pressure in the second oil chamber is controlled in accordance with a deviation between a target oil pressure and an actual oil pressure, comprising:
an electronic control unit,
wherein the electronic control unit detects a change in the capacity of the second oil chamber on the basis of a control amount of the oil pressure of the first oil chamber,
wherein the electronic control unit alters a variable to control the oil pressure of the second oil chamber on the basis of the change in the capacity of the second oil chamber,
wherein the electronic control unit performs a feedback control that controls the oil pressure of the second oil chamber in accordance with a feedback gain for at least one of proportional and integral control,
wherein the electronic control unit selects a first gain in a case where the change in capacity of the first oil chamber is below a predetermined threshold, and selects a second gain larger than the first gain in a case where the change in capacity of the first oil chamber is not below the predetermined threshold,
wherein the first gain and second gain are predetermined constants, and
wherein, when the second gain is selected, a difference between an actual clamping pressure for clamping the belt and a clamping pressure for clamping the belt set by the electronic control unit is less than the difference would be if the first gain had been selected.

2. The control system according to claim 1,
wherein the electronic control unit determines a change in the capacity on the basis of a command value for commanding a speed change.

3. The control system according to claim 2,
wherein the command value includes a duty command value for a duty solenoid valve for carrying out the speed change.

4. The control system according to claim 1,
wherein the electronic control unit performs feedback control in which an integral term proportional to an integration of the deviation is included in a calculation of a control amount, and
wherein the electronic control unit suppresses a change in the integral term in accordance with change in the capacity.

5. The control system according to claim 4,
wherein the electronic control unit fixes a value of the integral term to a preset value, in case the capacity of the oil chamber, or the rate or amount of the change of the speed change ratio, is at a predetermined reference value or larger.

6. The control system according to claim 5,
wherein the belt-type continuously variable transmission includes a transmission, in which the deviation between the target oil pressure and the actual oil pressure exhibits nonlinear characteristics, and
wherein the preset value, at which the value of the integral term is fixed, is a value to complement the nonlinear characteristics.

7. The control system according to claim 4,
wherein the electronic control suspends accumulation of the integral term, and holds the integral term to a value at the instance when the accumulation is suspended.

8. The control system according to claim 4, wherein the electronic control unit judges whether or not the speed change is an upshift in which the speed change ratio is reduced; and
suppresses a change in the integral term in case the upshift is judged.

9. The control system according to claim 4,
wherein the electronic control unit suppresses a change in the integral term, in case an actual oil pressure of the oil chamber at a speed changing time is higher than the target oil pressure.

10. The control system according to claim 1,
wherein the feedback control includes a proportional action to determine a control amount that is proportional to the deviation, and
the feedback gain includes a gain used in the proportional action.

11. The control system according to claim 1, wherein the target oil pressure is a theoretical clamping pressure Pt or a product of the theoretical clamping pressure Pt multiplied by a preset safety factor.

12. The control system according to claim 11, wherein the theoretical clamping pressure Pt is defined by the equation $$Pt = Tin \cdot \cos\theta / (2 \cdot \mu \cdot Rin \cdot A\ out)$$

wherein Tin is input torque, $\theta$ is an included angle of the belt on the first and second pulleys, $\mu$ is the friction coefficient between the pulleys and the belt, A out is a pressure-receiving capacity of the second oil chamber, and Rin is a running radii of the belt on one of the pulleys, which pulley is a drive pulley.

13. A control system for controlling a belt-type continuously variable transmission having a pair of pulleys including a first pulley which sets a speed change ratio and a second pulley which sets a clamping pressure for clamping the belt, in which the first pulley is provided with a first oil chamber to which an oil pressure is fed to reduce a groove width of the first pulley, in which a second pulley is provided with a second oil chamber to which an oil pressure is fed to clamp the belt and a capacity of the second oil chamber is varied in accordance with a change in the groove width of the first pulley, and in which the oil pressure in the second oil chamber is controlled on the basis of a deviation between a target oil pressure and an actual oil pressure, comprising:

an electronic control unit, wherein the electronic control unit detects a change in the speed change ratio set by the first pulley, wherein the electronic control unit alters a variable to control the oil pressure of the second oil chamber on the basis of a change in the speed change ratio, wherein the electronic control unit performs;

a feedback control that controls the oil pressure of the second oil chamber including at least one of a proportional action to reflect the deviation in accordance with a feedback gain, and an integral action to reflect an integration of the deviation, and wherein the electronic control unit performs at least one of;

selecting a first gain in a case where a change in the speed change ratio set by the first pulley is below a predetermined threshold, and selecting a second gain larger than the first gain in a case where a change in the speed change ratio set by the first pulley is not below the predetermined threshold, wherein the first gain and second gain are predetermined constants and suppressing a change in the integral term resulting from the integral action in a case where a change in the speed change ratio set by the first pulley is not below the predetermined threshold, and wherein, when the second gain is selected, a difference between an actual clamping pressure for clamping the belt and a clamping pressure for clamping the belt set by the electronic control unit is less than the difference would be if the first gain had been selected.

14. The control system according to claim 13, wherein the electronic control unit determines a change in the speed change ratio on the basis of the command value for commanding the speed change.

15. The control system according to claim 14, wherein the command value includes a duty command value for a duty solenoid valve for carrying out the speed change.

16. The control system according to claim 13, wherein the feedback control includes a proportional action to determine a control amount that is proportional to the deviation, and the feedback gain includes a gain used in the proportional action.

17. The control system according to claim 13, wherein the electronic control unit suspends an accumulation of the integral term, and holds the integral term to a value at an instance when the accumulation is suspended.

18. The control system according to claim 13, wherein the electronic control unit judges whether or not the speed change is an upshift in which the speed change ratio is reduced; and suppresses a change in the integral term in case the upshift is judged.

19. The control system according to claim 13, wherein the electronic control unit suppresses a change in the integral term in case an actual oil pressure of the oil chamber at a speed changing time is higher than the target oil pressure.

20. A control system for controlling a belt-type continuously variable transmission having a pair of pulleys including a first pulley which sets a speed change ratio and a second pulley which sets a clamping pressure for clamping the belt, in which the first pulley is provided with a first oil chamber to which an oil pressure is fed to reduce a groove width of the first pulley, in which a second pulley is provided with a second oil chamber to which an oil pressure is fed to clamp the belt and a capacity of the second oil chamber is varied in accordance with a change in the groove width of the first pulley, and in which the oil pressure in the second oil chamber is controlled in accordance with a deviation between a target oil pressure and an actual oil pressure, comprising:

a detecting device that detects a change in the capacity of the second oil chamber resulting from the speed change; and an oil pressure control contents altering device that alters a variable to control the oil pressure of the second oil chamber on the basis of a change in the capacity of the second oil chamber detected by the detecting device, wherein the oil pressure control contents altering device performs;

a feedback control that controls the oil pressure of the second oil chamber including at least one of a proportional action to reflect the deviation in accordance with a feedback gain, and an integral action to reflect an integration of the deviation, wherein the oil pressure control contents altering device includes at least one of;

a gain increasing device that increases the feedback gain by selecting a second gain which is larger than a first gain in a case where a change in the speed change ratio set by the first pulley is not below the predetermined threshold, wherein the first gain and second gain are predetermined constants and an integration suppressing device that suppresses a change in the integral term resulting from the integral action in a case where a change in the speed change ratio set by the first pulley is not below the predetermined threshold, and wherein, when the second gain is selected, a difference between an actual clamping pressure for clamping the belt and a clamping pressure for clamping the belt set by the electronic control unit is less than the difference would be if the first gain had been selected.

* * * * *